March 6, 1962　　　W. A. HASBANY　　　3,023,773
REGULATING VALVE

Original Filed Nov. 10, 1958　　　2 Sheets-Sheet 1

INVENTOR.
WOODROW A. HASBANY
BY
Kenneth C. Witt
ATTORNEY.

March 6, 1962  W. A. HASBANY  3,023,773
REGULATING VALVE

Original Filed Nov. 10, 1958  2 Sheets-Sheet 2

INVENTOR.
WOODROW A. HASBANY
BY Kenneth C. Witt
ATTORNEY.

United States Patent Office 3,023,773
Patented Mar. 6, 1962

3,023,773
REGULATING VALVE
Woodrow A. Hasbany, South Bend, Ind., assignor to Clark Equipment Company, a corporation of Michigan
Original application Nov. 10, 1958, Ser. No. 772,920. Divided and this application Nov. 23, 1959, Ser. No. 854,721
2 Claims. (Cl. 137—495)

This invention relates to improvements in valve means for use in fluid operated control systems. More particularly, the valve means of this invention is constructed to control and regulate fluid pressures, and it may be disposed, for example, between a source of pressurized fluid and a device operated thereby such as a transmission clutch.

This is a division of application Serial No. 772,920, filed November 10, 1958, now Patent No. 2,977,979, dated April 4, 1961.

Briefly, this invention constitutes an improvement in so-called "inching" control valve mechanisms. Such control valve mechanisms may be used in regulating pressure to a fluid operated clutch of the type found in industrial lift trucks and other machines. Specifically, such a control valve means is frequently constructed to permit an immediate relief of a portion of the clutch application pressure followed by regulated decrease or increase in the pressure of fluid supplied to a fluid operated clutch whereby the latter may be gradually disengaged or engaged by the operator. One particular use of this type of regulating valve, as mentioned, contemplates the control of a fluid pressure actuated clutch for the transmission of an industrial lift truck. In such a vehicle, it is often necessary to hold the truck stationary while the lift fork or like material engaging device is operated at a speed corresponding to full engine speed without shifting the transmission to neutral position. It is desirable in such circumstances to be able to "inch" the vehicle forwardly or reversely, as desired, to make possible its accurate positioning and the handling of material.

Conventionally, the vehicle transmission has been kept in gear and the brakes of the vehicle have been employed to control "inching" of the vehicle. This method of control is undesirable because it requires considerable pressure to be applied to the brake pedal by the operator of the vehicle and also causes undesirable wear of the brake linings.

Various control and regulating valves for performing the above stated function in conjunction with power shifted transmissions employing fluid pressure actuated transmission clutches have been disclosed previously, as exemplified by U.S. Patents No. 2,786,368 dated March 26, 1957 and 2,814,371 dated November 26, 1957.

In order to carry out the above mentioned "inching" feature, valve means, such as described in the above identified patents have been provided to effect improved gradual engagement and disengagement of the vehicle clutch, after relief of excess pressures in the system, by operating such valve means in conjunction with the application and release of the vehicle brake system. The operation of such valve means may be either hydraulic by application of fluid pressure in the brake system, or mechanical by means of a linkage connection with the brake pedal of the vehicle. In such structures when the brakes are actuated the valve means shifts to a position interrupting fluid flow to a clutch control valve and effects controlled partial deactuation of the clutch means thus providing control of the torque to the wheels of the vehicle. When the brake pedal is released, the valve means is returned to its normal position reestablishing communication between the clutch control valve and the source of fluid under pressure. As a result of the above arrangement, drive between the input and output shafts of the vehicle transmission may be controlled to permit "inching" of the vehicle without interfering with the operations of raising and lowering a load.

The valve means of the present invention constitutes an improvement upon the structures of the above identified patents and may be generally characterized as an improved arrangement of a spool type valve having a suitable porting system and a novel arrangement of opposing spring means therein, so as to provide an accurate, but rugged valve means capable of relieving over-pressures to gain a workable pressure which is thereafter regulated to control a transmission clutch of a vehicle such that the pressure of the clutch, or other controlled device, is balanced against a spring in order to regulate the clutch pressure automatically at a value responsive to the position of the brake pedal or other controlling device.

With the foregoing in mind, it is a primary object of the present invention to provide new and improved regulating valve means having pressure relief and regulating features for use in fluid operated control systems.

Another object of the present invention is to provide a new and improved inching valve for use in industrial lift trucks and having fluid pressure actuated transmission clutch to the end that the vehicle's clutch mechanism may be gradually engaged or disengaged at the will of the operator by operating the vehicle's brake system.

Still another object of the present invention is to provide a new and improved inching valve means for industrial lift trucks and like vehicles which is universally adaptable for either hydraulic or mechanical operation at the manipulation of a foot pedal associated with the vehicle's brake system.

A still further object of the present invention is to provide a new and improved inching valve means for controlling the fluid pressure to a clutch mechanism in a vehicle, for initially relieving excess pressure on the clutch and then balancing the actuating pressure of the clutch against a spring to thereby regulate the clutch pressure automatically at a value responsive to the position of the vehicle brake pedal or other controlling device.

A still further object of the present invention is to a new and improved inching valve structure which may be readily substituted for existing valve means in a vehicle with a minimum of modification thereto.

A still further object of the present invention is to provide a new and improved regulating valve for controlling the fluid pressure to a fluid actuated clutch mechanism of a vehicle, having a minimum number of parts, which is of simple and rugged construction, is efficient and reliable in operation, and is inexpensive to manufacture.

The above and other objects, features and advantages of the present invention will be apparent to those familiar with the art from the following detailed description of a preferred embodiment thereof as shown in the accompanying drawing forming a part hereof and wherein.

Figure 1:
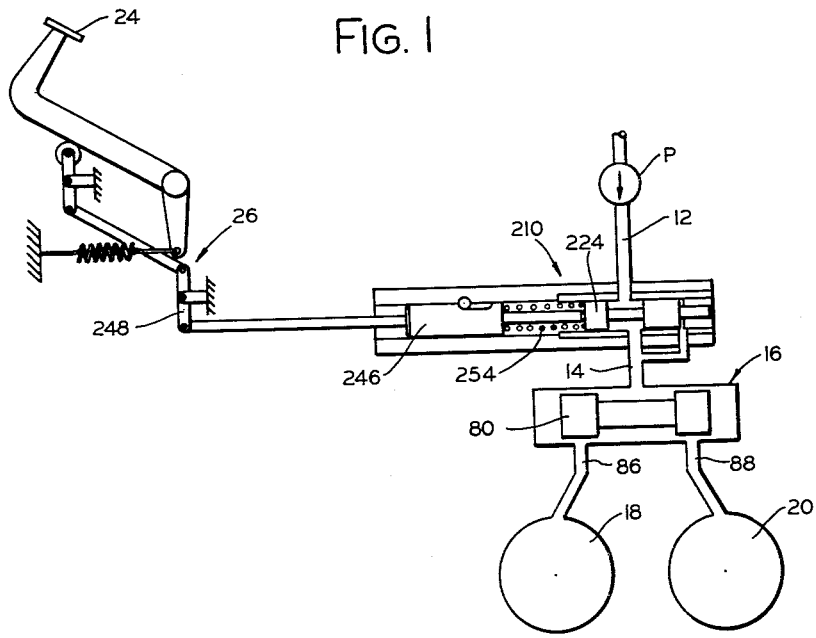
FIGURE 1 is a schematic representation of a typical fluid system in which the improved valve of the present invention finds utility.

As seen in FIGURE 1, the new and improved regulating valve 210 of the present invention is employed in a fluid circuit of an industrial lift truck. Valve 210 serves to control the pressure of fluid supplied by way of inlet 12 from the pump P which may be driven by the engine of the vehicle, to a conduit 14 leading to a clutch direction selector 16. Selector 16 controls the actuation of reverse and forward fluid pressure actuated clutches 18 and 20, respectively, in the vehicle's transmission. Valve 210 includes a piston or plunger 246 which is shiftable in response to actuation of the brake pedal of the vehicle as indicated at 24. Brake pedal 24 is connected with piston 246 by a suitable linkage system indicated generally at 26 and including a crank lever 248.

Leftward movement of the piston 246 allows elongation of a spring 254 and reduces the pressure exerted by this spring on a spool member 224. At the opposite end of the spool member 224 it is subjected to an opposing force which is proportional to the outlet fluid pressure in conduit 14 leading to the clutch direction selector. A balance between the two forces acting on spool member 224 results and depending upon the position of brake pedal 24 this results in varying the position of spool 224 to regulate the outlet pressure. The regulating action in the present invention is effected responsively to the adjusted outlet or clutch pressure as contrasted to a regulation of the inlet pressure in the aforementioned patent 2,814,371, for example. The regulating valve of the present invention is more sensitive and more rapid in operation than previous types of inching valve structures for accomplishing a similar function.

Under normal operating conditions of the vehicle, that is, with the brakes released, pressurized fluid from the inlet 12 flows at full supply pressure through the regulating valve 210 and thence into the conduit 14 whereby it is delivered to direction selector means 16 which controls operation of the fluid clutch mechanisms 18 and 20 of the vehicle. Such direction selector means includes a double acting valve spool 80 herein disposed transversely of the direction selector means. Positioning of spool 80 is in response to actuation of a selector control lever (not shown) available to the vehicle's operator. The positioning of the selector spool 80 serves to control the passage of pressurized fluid to conduits 86 or 88 thus to control the operation of forward or reverse transmission direction clutches 18 and 20. In this regard, note that the spool 80 has three positions of operation, neutral as shown in FIGURE 1, or to either side of the neutral position to selectively admit pressurized fluid to either of the two direction clutches 18 or 20.

Figure 4:
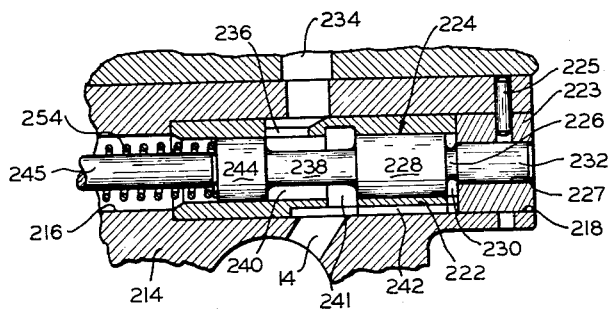
FIGURE 4 is an enlarged fragmentary cross-sectional view of a portion of the valve mechanism shown in FIGURE 3.
Figure 2:
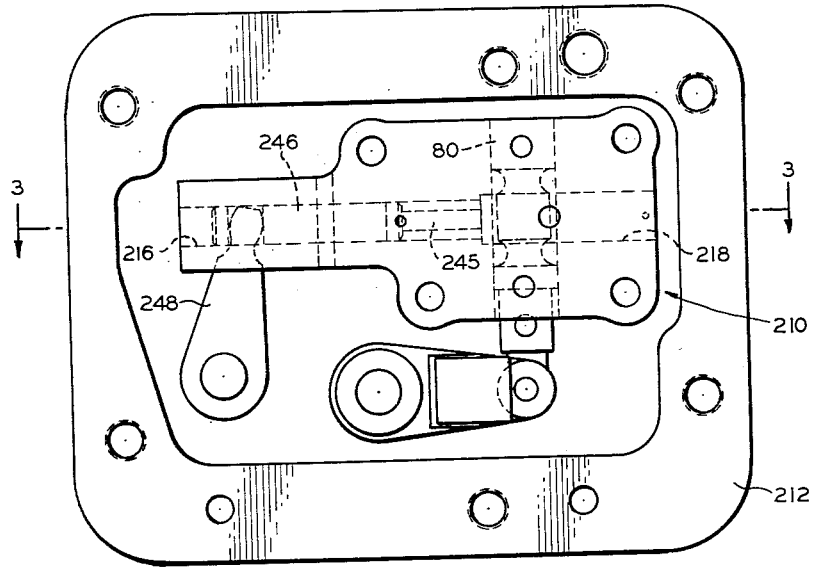
FIGURE 2 is a top plan view of a regulating valve embodying the present invention taken on the line 2—2 of FIGURE 3.
Figure 3:
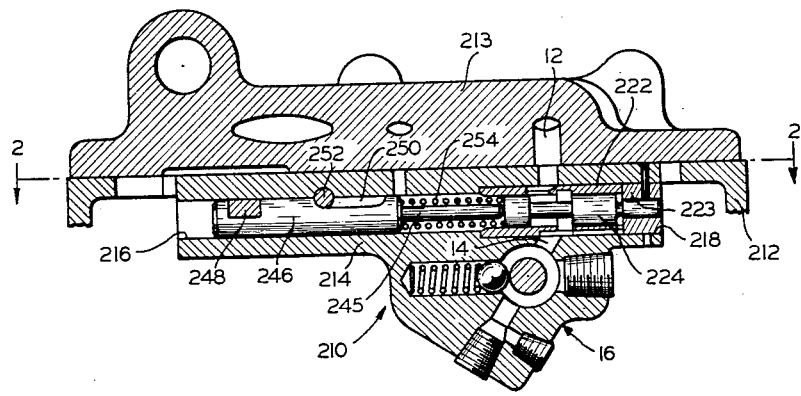
FIGURE 3 is a longitudinal cross-sectional view taken approximately along the line 3—3 of FIGURE 2.

For a more detailed description of this invention reference is made to FIGURES 2, 3 and 4. As illustrated the valve 210 is located within a suitable housing 212 having a removable cover 213. The valve has a body portion 214 provided with an internal cylindrical bore or chamber portion 216 at one end thereof and an enlarged coaxial bore or chamber portion 218 at the opposite end thereof. The bore 218 is provided with an internal sleeve 222 which is suitably formed to provide fluid passageways as will appear presently. A valve spool 224 is suitably positioned for axial sliding movement within the sleeve 222. A plug member 223, held in a suitable manner such as by a pin 225, holds the sleeve 222 in position. The plug 223 has a cylindrical opening 227 therein aligned axially with the axis of valve spool 224. Near the right end of valve spool 224, the valve spool has a land portion 232 which moves reciprocably in opening 227, always maintaining a sealing relation to prevent escape of fluid (except for leakage) from within the valve mechanism. A necked down portion 226 connects land portion 232 with a larger land portion 228 on valve spool 224.

An inlet passage 12 from the pump communicates by means of an opening 236 in the sleeve 222 with an annular chamber 240 formed by a reduced diameter portion 238 of the spool 224 and the adjacent cylindrical walls of the sleeve 222. The sleeve 222 is suitably formed so as to provide an equalizing passageway 242 communicating between an outlet annulus 241 which communicates with the annular chamber 240, and an annular chamber 230 at the right hand end of the valve spool 224, and thereby serves to equalize fluid pressures in chambers 230 and 240. The left hand end of the spool body 224 has a third land portion 244. Such portion 244 abuts against a rod or reduced end portion 245 of a piston 246 which is responsive to the actuation of the vehicle brake pedal 24 (FIGURE 1). In the present modification the piston is shown as adapted for mechanical operation and is connected to the brake pedal 24 by means of the linkage 26 through a crank lever 248 (FIGURE 2) which oscillates upon movement of the linkage 26 to impart a reciprocating movement to the piston 246. The piston 246 is cut away at 250 to form a slot for a key pin 252 which traverses the piston 246; interference between pin 252 and the ends of the cut away portion 250 serving to limit the throw of piston 246 and hold the same within the bore 216. Surrounding the reduced end portion 245 of the piston 246 and abutting against the piston and the portion 244 of spool 224 is a compression spring 254. The compression spring 254 serves to oppose the pressure of fluid in the chamber 230 (the spool being hydraulically unbalanced by such pressure) and thus to maintain the valve spool 224 normally in the position illustrated in FIGURES 3 and 4.

As the pressurized fluid from inlet passage means 12 enters annular chambers 240 and 230, as explained hereinabove, it also flows at full supply pressure via discharge passage 14 to the direction selector means 16 which controls operation of the fluid clutch mechanism for the vehicle. The pressurized fluid is delivered to the annular chamber 240 near the mid section of the valve spool 224 and via the equalizing passageway 242 to the second annular chamber 230 at the right hand end of the spool. Pressure in chamber 230 urges the spool 224 to the left, as viewed in FIGURES 3 and 4, but such movement is counteracted by the force of the compression spring 254.

When the brake pedal 24 is depressed to operate the brake, such movement is utilized to operate piston 246. The travel of piston 246 reduces the compressive force of spring 254. Thus the spring allows the spool 224 to move to the left and the cylindrical portion 228 thereof to restrict and regulate the flow of fluid from the annular discharge opening 241 in sleeve 222, via the discharge conduit 14 to the clutch of the vehicle. The crank lever 248 which operates the piston 246 is biased to assume the position illustrated, by means of suitable spring means (not shown) which may be located anywhere in the linkage externally of the housing 212.

The above described structure is such that as the brake pressure is increased the clutch pressure is decreased until ultimately the brake is fully on and the clutch is fully disengaged. Conversely, release of the brake pedal 24 allows the piston 246 to return toward the right thereby causing the valve spool 224 to return to the illustrated position to open fully the fluid circuit from the pump to the clutch so that the latter is fully engaged. Thus, again, merely by depressing the brake pedal a regulating action is automatically effected which is highly sensitive and is responsive to the degree of brake application to thereby regulate the supply of fluid to the clutch whereby "inching" operation may be readily effected.

It will be appreciated by those skilled in the art that this regulating valve may be readily adapted for operation by fluid means from the vehicle's brake system instead of by mechanical linkage as described and illustrated herein. To do this it is necessary merely to substitute a suitable fluid operated piston for mechanically operated piston 246 and provide connections for hydraulic fluid from the hydraulic brake system of the vehicle to actuate such piston.

From the foregoing, it is believed that the concept and features of the present invention will be clearly understood by those familiar in the art. While the invention has been disclosed and described by way of reference to a certain preferred embodiment thereof, it is obvious that

I claim:

1. A regulating valve of the character described, said valve comprising a valve body having a longitudinal cylindrical bore therein, a pressure inlet and a pressure outlet communicating with said bore, a regulating valve spool in said bore which is substantially hydraulically balanced with respect to the pressure at said inlet and adapted and arranged to adjust the flow of pressure fluid between said inlet and said outlet, a piston in said bore having an operating rod normally engaging said valve spool, means for moving said piston, regulating passage means in said body communicating with said outlet and said bore and adapted and arranged to hydraulically unbalance said valve spool in response to the pressure existing at said outlet, and regulating spring means surrounding said operating rod between said piston and said valve spool normally biasing said valve spool in opposition to the hydraulic unbalance thereof, whereby upon movement of said piston in the direction away from said valve spool the valve spool shifts in response to the hydraulic unbalance to reduce the flow of pressure fluid between said inlet and said outlet and thereafter a regulating action occurs between said inlet and said outlet under the influence of said regulating spring in response to the adjusted pressure existing at said outlet.

2. A pressure regulating valve mechanism comprising a body portion having an elongated chamber therein, a removable sleeve member lining the said elongated chamber for a portion of its length, the said sleeve member having a fluid inlet opening through the wall thereof and the fluid outlet opening through the said wall adjacent the said fluid inlet opening, a spool member slidably disposed in the said sleeve member and adapted to provide substantially unrestricted communication between the said inlet and outlet openings in one position of the said spool member and to variably restrict communication between the said inlet and outlet openings in other positions of the said spool member, the said spool member including two land portions separated by a reduced diameter portion forming an annular space between such reduced diameter portion and the said sleeve, the said spool member when in the said unrestricted communication position being located with a first land portion adjacent to but not obstructing the said outlet opening or the annular space connecting the said inlet and outlet openings, means for admitting fluid at outlet pressure to one end of the said spool member adjacent the said one land portion for exerting an axial force on the said spool member proportional to the said fluid outlet pressure, the said means including a regulating passageway in the outer surface of the said sleeve member, a piston in the said chamber having a rod portion thereon abutting the opposite end of the said spool member in the said unrestricted communication position thereof, a coiled regulating spring under compression located in the said chamber around the said rod portion between the said piston and the said opposite end of the said spool member for exerting a force on the spool member in opposition to that exerted by the said fluid pressure, means for moving the said piston away from the said spool member whereby to reduce the force exerted thereon by the said spring and allow the said rod portion to move away from the said spool member and provide a balance of forces on the said spool member exerted by the said spring and the said fluid pressure for varying the extent to which the said first land portion covers the said outlet opening and thereby varying the extent of communication between the said inlet and outlet openings and regulating the said outlet pressure.

References Cited in the file of this patent

UNITED STATES PATENTS

| | | |
|---|---|---|
| 297,373 | Freese | Apr. 22, 1884 |
| 625,324 | Craig | May 23, 1899 |
| 1,516,011 | Heath | Nov. 18, 1924 |
| 2,720,420 | Seifferle | Oct. 11, 1955 |
| 2,814,371 | Bolster | Nov. 26, 1957 |